US005977644A

United States Patent [19]

Smith

[11] Patent Number: 5,977,644

[45] Date of Patent: Nov. 2, 1999

[54] BACKUP POWER SYSTEM HAVING IMPROVED COOLING AIRFLOW AND METHOD OF OPERATION THEREOF

[75] Inventor: William C. Smith, Garland, Tex.

[73] Assignee: Lucent Technologies Inc., Murray Hill, N.J.

[21] Appl. No.: 08/920,069

[22] Filed: Aug. 26, 1997

[51] Int. Cl.[6] .......... H02P 9/04

[52] U.S. Cl. .......... 290/1 B; 290/1 A; 290/1 R; 123/2; 123/198 E; 123/204

[58] Field of Search .......... 290/1 A, 1 R, 290/1 B; 181/202, 204; 123/2, 198 E, 204; 322/1, 40

[56] References Cited

U.S. PATENT DOCUMENTS

| | | | |
|---|---|---|---|
| 4,733,750 | 3/1988 | Poirier et al. | 181/202 |
| 4,759,181 | 7/1988 | Biritz | 60/321 |
| 4,835,405 | 5/1989 | Clancey et al. | 290/1 A |
| 5,174,406 | 12/1992 | Lee | 180/68.2 |
| 5,433,175 | 7/1995 | Hughes et al. | 123/2 |
| 5,554,902 | 9/1996 | Kessens et al. | 310/254 |
| 5,584,185 | 12/1996 | Rumble et al. | 62/115 |
| 5,624,589 | 4/1997 | Latvis et al. | 219/133 |
| 5,731,687 | 3/1998 | Hirano et al. | 322/1 |

*Primary Examiner*—Elvin Enad

[57] ABSTRACT

Backup power systems and methods of operation thereof. In one embodiment, a backup power system constructed according to the present invention includes: (1) an enclosure, (2) an engine, having an air inlet, located within the enclosure, (3) an alternator, coupled to and driven by the engine, that converts mechanical power derived from the engine into AC electrical power and (4) a baffle, located within the enclosure and about a portion of the engine to block direct fluid communication from within the alternator to within the engine, that guides cooling air received into the enclosure sequentially through the alternator to cool the alternator, around the baffle and the engine, through the air inlet and into the engine to cool the engine and through an outlet port of the baffle, the baffle thereby establishing a serial path within the enclosure for the cooling air.

20 Claims, 3 Drawing Sheets

BACKUP POWER SYSTEM HAVING IMPROVED COOLING AIRFLOW AND METHOD OF OPERATION THEREOF

TECHNICAL FIELD OF THE INVENTION

The present invention is directed, in general, to engine-driven alternators and, more specifically, to a backup power system having an engine-driven alternator and an improved cooling airflow therefor and a method of operating the backup power system.

BACKGROUND OF THE INVENTION

For many applications, such as telecommunications services, a reliable source of back-up power is critical. A back-up power system may employ an engine-driven alternator to generate electrical power. A combustion engine is used to drive an alternator which produces an AC voltage; the AC voltage may then be rectified to produce a DC voltage. An engine-driven alternator may come online whenever a commercial source of power is disrupted or, alternatively, the engine-driven alternator may be used to charge a battery plant, the battery plant providing a source of electrical power during interruptions in commercial power service.

Many back-up power systems must be placed in harsh environments, such as outdoor locations. In warm and/or arid climates, outdoor locations present the problem of adequate dissipation of heat generated by engine-driven alternators. To ensure system reliability, engine-driven alternators must not be allowed to overheat; thus, enclosures for containing such systems must provide sufficient airflow not only to cool the engine, but also to meet the fuel-mixture demands of the engine and carry exhaust gases out of the enclosure.

Back-up power systems employing engine-driven alternators must sometimes be placed in locations where persons other than trained service personnel may come into contact with them. Thus, such systems must not subject unsuspecting persons to any undue hazards. A conventional enclosure for an engine-driven alternator is constructed as a single-walled metal box; the box includes inlets for drawing ambient air into the enclosure and outlets for expelling exhaust gases. It has been observed, however, that single-walled enclosures may exhibit very-high surface temperatures due to stagnant air trapped within the enclosure; the stagnant air results in internal heat build-up that is transferred to the outer enclosure walls. Thus, although such conventional enclosures may be suitable for some applications, the enclosures do not adequately protect against excessive surface temperatures that may cause injury to unsuspecting persons.

In addition, back-up power systems employing engine-driven alternators are not always placed in remote locations, but may be placed near residences or work areas. Thus, such systems should not be obtrusive or a source of annoyance; for example, such systems should not create excessive noise. Unfortunately, engine-driven alternators inherently generate acoustic noise. To suppress the inherent noise, an enclosure must provide for noise isolation. It has been observed, however, that conventional single-walled enclosures do not adequately attenuate the inherent noise generated by engine-driven alternators.

Accordingly, what is needed in the art is a backup power system, employing an engine-driven alternator, that provides improved cooling airflow and which reduces the temperature of external enclosure surfaces and acoustic noise levels.

SUMMARY OF THE INVENTION

To address the above-discussed deficiencies of the prior art, the present invention provides backup power systems and methods of operation thereof. In one embodiment, a backup power system constructed according to the present invention includes: (1) an enclosure, (2) an engine, having an air inlet, located within the enclosure, (3) an alternator, coupled to and driven by the engine, that converts mechanical power derived from the engine into AC electrical power and (4) a baffle, located within the enclosure and about a portion of the engine to block direct fluid communication from within the alternator to within the engine, that guides cooling air received into the enclosure sequentially through the alternator to cool the alternator, around the baffle and the engine, through the air inlet and into the engine to cool the engine and through an outlet port of the baffle, the baffle thereby establishing a serial path within the enclosure for the cooling air.

The present invention therefore introduces the broad concept of cooling an engine-driven alternator backup power system serially, rather than in parallel. Because the various pieces of equipment are cooled sequentially, conflicts or interferences in airflow that might otherwise occur are avoided.

In one embodiment of the present invention, the backup power system further comprises a rectifier, coupled to an electrical output of the alternator, that converts the AC electrical power into DC electrical power, the baffle guiding the cooling air to cool the rectifier before guiding the cooling air through the alternator. Of course, if the backup power system is to supply AC electrical power, the rectifier may not be necessary. In an embodiment to be illustrated and described, the rectifier is provided with a heat sink adapted to receive the cooling air therethrough.

In one embodiment of the present invention, the engine has a muffler located proximate the outlet port, engine exhaust expelled from the muffler mixing with cooling air expelled through the outlet port to thereby drive the exhaust gases out of the enclosure. Mixing not only lowers the temperature of the engine exhaust, but may also help mask engine noise.

In one embodiment of the present invention, the baffle forms a double wall with the enclosure to cause the cooling air to cool the enclosure. The double wall can also damp acoustic energy developed within the enclosure.

In one embodiment of the present invention, the cooling air is received through a single air intake in the enclosure. Of course, the enclosure may provide multiple air intakes, as long as the baffle's purpose is not defeated thereby.

In one embodiment of the present invention, the baffle divides the enclosure into first and second compartments, the first compartment containing control circuitry and receiving the cooling air before the second compartment. By dividing the enclosure into separate compartments, the present invention recognizes the differing environmental requirements of the rectifiers (and other electronic circuitry) and the engine and alternator.

In one embodiment of the present invention, the alternator is employed to power telecommunications equipment. Of course, the backup power system of the present invention may be employed to advantage in other environments.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
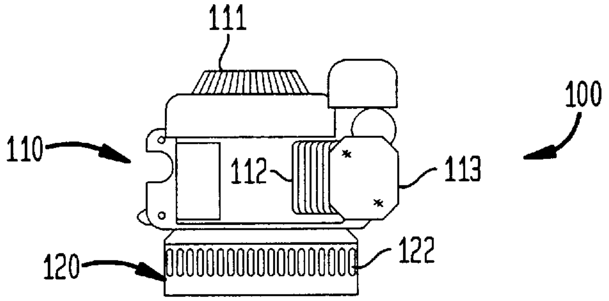
FIG. 1A (PRIOR ART)
FIG. 1 illustrates three regular views of a conventional engine-driven alternator.
Figure 1B:
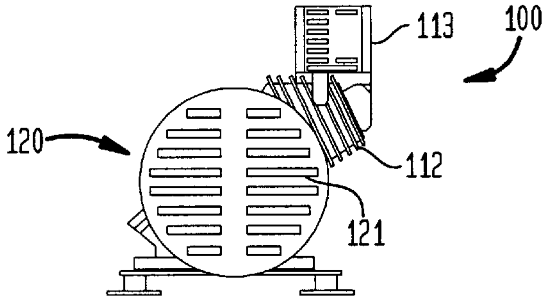
FIG. 1B (PRIOR ART)
Figure 1C:
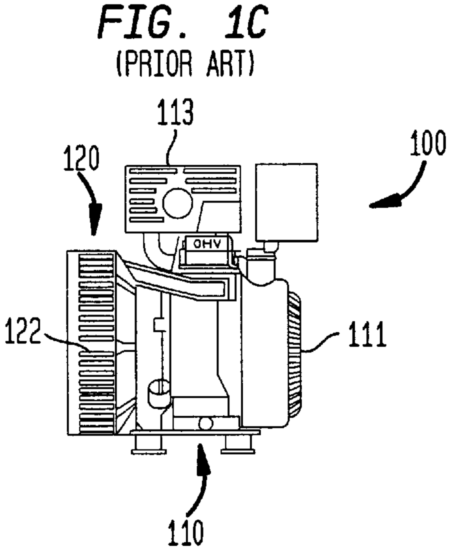
FIG. 1C (PRIOR ART)

Referring initially to FIG. 1, illustrated are three regular views of a conventional engine-alternator 100. The engine-alternator 100 includes an internal combustion engine 110 that drives an alternator 120 for generating AC power. The alternator 120 includes an internal fan that draws air in through front vents, generally designated 121, and expels the air through side vents, generally designated 122, to provide cooling of the alternator. The combustion engine 110 also drives an engine fan 111 to force air over a cylinder head of the combustion engine whereby the engine may be cooled for more efficient operation. The combustion engine 110 also includes an exhaust system that includes an exhaust manifold 112 and a muffler 113.

Figure 2:
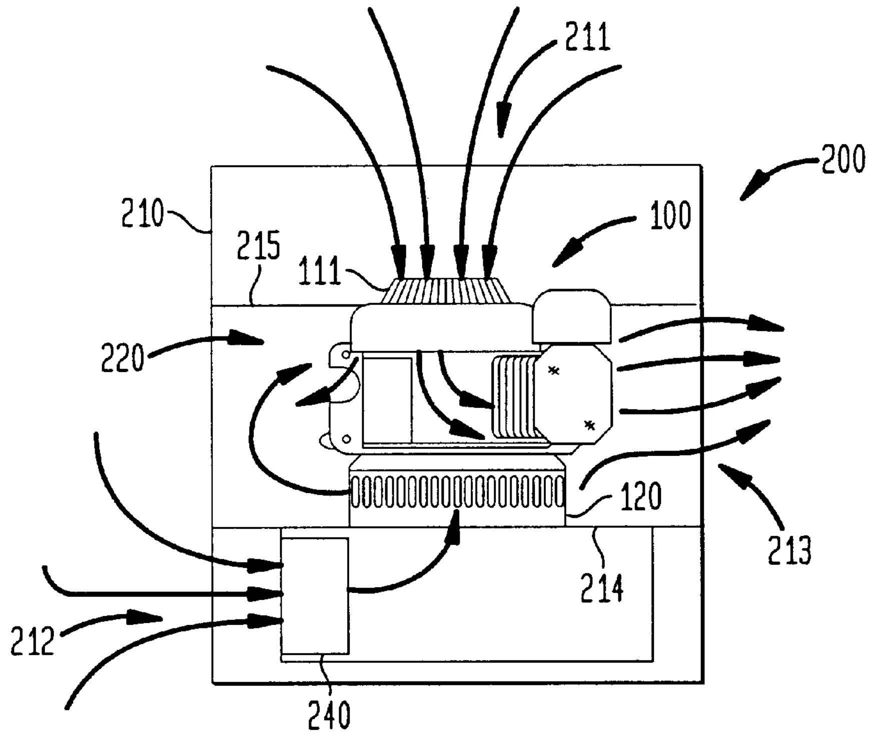
FIG. 2 (PRIOR ART)
FIG. 2 illustrates the air-flow characteristics of a prior art structure for housing and cooling a conventional engine-driven alternator.

Turning now to FIG. 2, illustrated are the air-flow characteristics of an exemplary prior art structure 200 for housing a conventional engine-alternator 100. The structure 200 includes an cabinet 210 that has intake vents 211, 212 and exhaust vent 213. An internal front air dam 214 frames the alternator 120 and a rear air dam 215 frames the engine fan 111 to form a center chamber 220 within cabinet 210; the engine-alternator 120 is substantially contained within the center chamber 220. A rectifier 240, which may include a heat sink, may be located proximate the intake vent 211, whereby the rectifier may be cooled as air is drawn into the cabinet 210 through intake vent 211.

During operation, air is drawn into the cabinet 210 through the intake vents 211 and 212 by engine fan 111 and alternator 120, respectively. The air drawn in through the intake vent 211 passes through the engine fan 111 and into the center chamber 220; similarly, the air drawn in through the intake vent 212 passes through the alternator 120 and into the center chamber 220. The separate air streams entering the center chamber 220 through engine fan 111 and alternator 120 form a confluence of air about engine-alternator 100; the two air streams enter the center chamber 220 from opposing sides thereof, which can result in stagnant air pockets within the center chamber, which may inhibit the dissipation of heat generated by engine-alternator 100. At least some of the air entering the center chamber 220, however, will mix with and carry hot exhaust gases out through exhaust vent 213.

Figure 3:
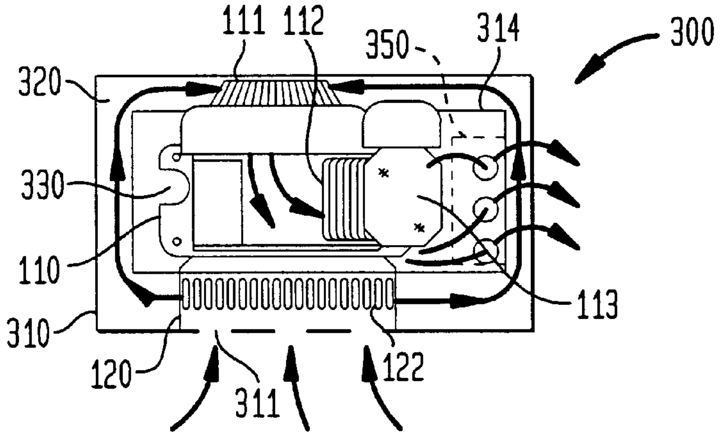
FIG. 3 illustrates the air-flow characteristics of an exemplary structure, constructed according to the principles of the present invention, for housing and cooling an engine-driven alternator.

Turning now to FIG. 3, illustrated are the air-flow characteristics of an exemplary structure 300 that employs the principles of the present invention to cool an engine-alternator 100 contained therein. The structure 300 includes an enclosure 310 that has an intake vent 311 located proximate to the front vents 121 of alternator 120 (see description hereinabove with reference to FIG. 1). A baffle 314, within the enclosure 310, surrounds substantially all of the engine 110, thereby forming an outer chamber 320 between the enclosure 310 and baffle 314 and an inner chamber 330 within the baffle 314 and about the engine 110. The baffle 314 includes openings through which the alternator 120 and engine fan 111 protrude; the side vents 122 of alternator 120 and the intake of engine fan 111 are positioned within outer chamber 320. The inner chamber 330 also includes an exhaust vent 350, which may be located on an upper wall of the baffle 314.

During operation, air is drawn into the enclosure 310 by alternator 120 through the intake vent 311 and front vents 121 of the alternator 120. The air drawn in through the alternator 120 is directed into the outer chamber 320 through the side vents 122 of the alternator; the baffle 314 prevents direct fluid communication of the air drawn into the enclosure 310 through the alternator 120 from the engine 110. The air then passes around both sides of baffle 314 and is drawn into the inner chamber 330 through the engine fan 111. The air then cools the engine 110 and is expelled through the exhaust vent 350.

The structure 300 thus provides a means to channel an airflow in a series path, the path first passing through an internal fan in alternator 120 and then through the engine fan 111. The air passing through the alternator 120, which is relatively cool when drawn through the front vents 121, is slightly heated by the alternator before it is driven through the side vents 122 into the outer chamber 320. The slightly-heated air is then drawn from the outer chamber 320 by the engine fan 111 into the inner chamber 330; the engine fan 111 forces the slightly-heated air over the engine 110 to cool the engine which generally operates at a relatively-high temperature. The air then passes over and around the exhaust manifold 112 and muffler 113, cooling the exhaust system, before exiting through the exhaust vent 350.

The "double wall" design of the structure 300 provides several advantages over conventional enclosures for engine-driven alternators. First, the air that flows through the outer chamber 320 is only slightly-heated after exiting the alternator 120; the flow of relatively-cool air helps to prevent the heat generated by the engine 110 in the inner chamber 330 from being transferred to the enclosure 310, thereby maintaining a safe external temperature. Second, the double wall around the engine helps to attenuate acoustic noise generated by the engine 110. Third, the airflow into the inner chamber 330 is driven only by the engine fan 111, rather than the engine fan 111, as in the conventional structure 200 illustrated in FIG. 2, which helps to avoid the problem of stagnant air pockets that may be caused by the confluence of two forced airflows.

Figure 4:
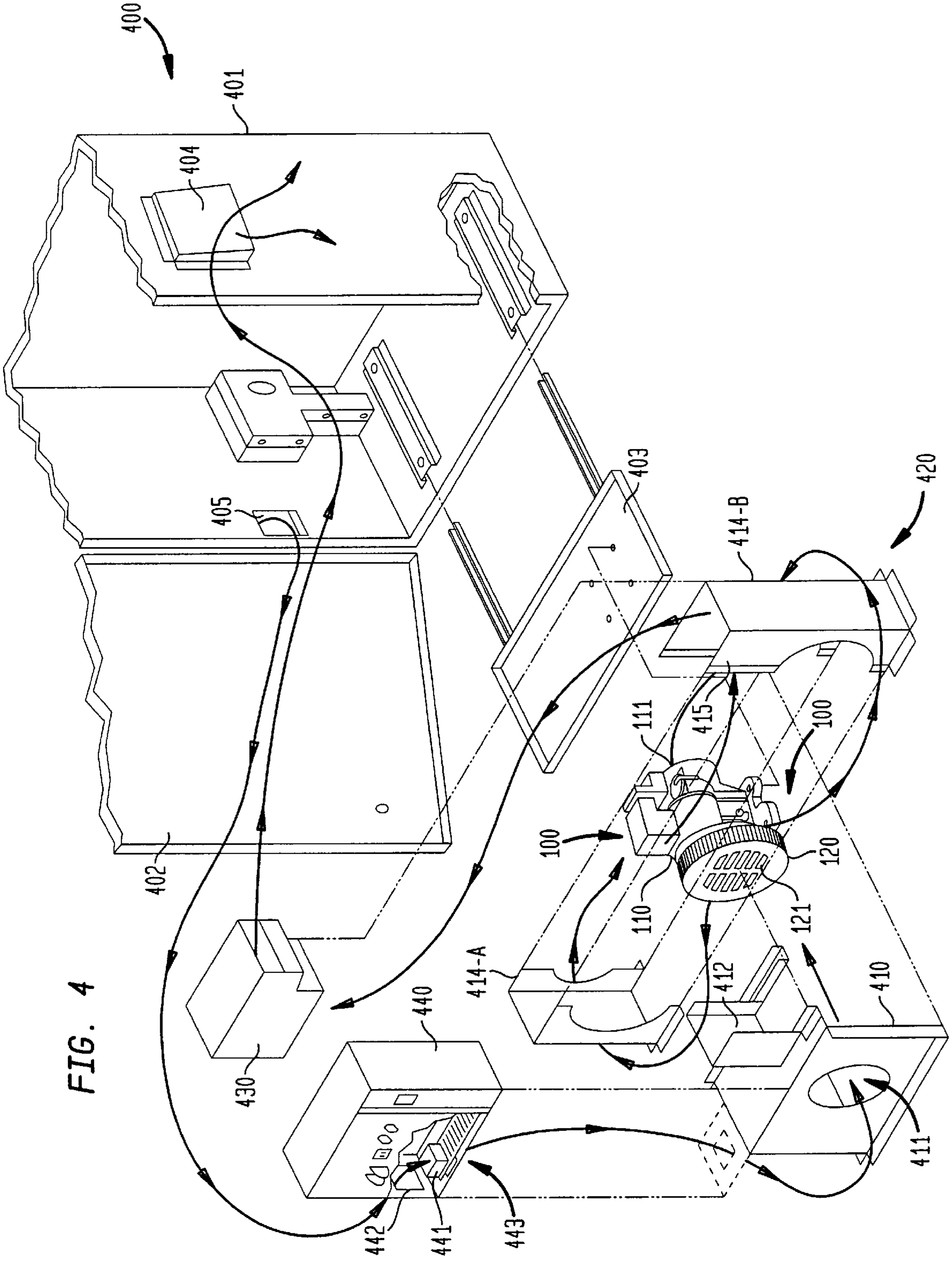
FIG. 4 illustrates an exploded view of an exemplary backup power system employing the principles of the present invention.

Turning now to FIG. 4, illustrated is an exploded view of an exemplary backup power system 400 employing an engine-alternator 100. As noted previously, backup power systems are frequently used to provide backup power to telecommunications equipment; for example, a backup power system may be mounted on a utility pole to power line amplifiers or transmitters in the event of a loss of commercial power. For pole-mount applications, in particular, the exemplary backup power system 400 may use a weatherproof cabinet 401 which has a door 402 and slide-out tray 403. The door 402 allows access to the engine-alternator 100 mounted on the slide-out tray 403; the slide-out tray may be extended from the cabinet 401 to allow for repair and maintenance of the engine-alternator 100.

The backup power system 400 includes an engine-alternator 100 that is surrounded by an airflow channeling structure 420 for directing an airflow for cooling the engine-alternator, as described with reference to FIG. 3. The airflow channeling structure 420 includes an enclosure 410 that substantially surrounds the front, left and top sides of the engine-alternator 100; the back and right sides of the engine-alternator 100 are surrounded by the rear and right side walls of the cabinet 401. The enclosure 410 includes an intake vent 411 located proximate to the front vents 121 of alternator 120 (see description hereinabove with reference to FIG. 1). Those skilled in the art will recognize that, in combination, the enclosure 410 and the rear and right side walls of the cabinet 401 provide the same function as the enclosure 310 illustrated in FIG. 3.

The airflow channeling structure 420 further includes a baffle 414, formed from left and right baffle portions 414-A and 414-B, respectively, which surrounds substantially all of the engine 110. The combination of the enclosure 410, the rear and right side walls of the cabinet 401 and the baffle 414 forms an outer chamber between the enclosure 410 and rear and right side walls of the cabinet 401 and the baffle 414, and an inner chamber within the baffle 414 and about the engine 110; the inner and outer chambers correspond to inner chamber 330 and outer chamber 320 described with reference to FIG. 3. The baffle 414 includes openings through which the alternator 120 and engine fan 111 protrude; the side vents 122 of alternator 120 and the intake of engine fan 111 are positioned within the outer chamber. The right baffle portion 414-B includes an upper portion 415 that mates with an upper portion 412 of enclosure 410 to form a chimney which is capped with an exhaust vent 430.

During operation, air is drawn into the enclosure 410 by alternator 120 through the intake vent 411 and front vents 121 of the alternator 120. The air drawn in through the front vents 121 of the alternator 120 is directed out through the side vents 122 and into the outer chamber between the enclosure 410 and baffle 414; the baffle 414 prevents direct fluid communication of the air drawn into the enclosure 400 through the alternator 120 from the engine 110. The air then passes around both sides of baffle 414 and is drawn into the inner chamber through the engine fan 111. The air then cools the engine 110, mixes with the exhaust gases from the engine 110 and is carried out through the exhaust vent 430, which is positioned proximate to a vent 404 in the wall of cabinet 401.

The backup power system 400 may further include a power conversion unit 440 that receives the AC power generated by the alternator 120 and converts it to DC power; those skilled in the art are familiar with power conversion systems. The DC power may be used to power telecommunications systems (not shown) which may be housed within or without cabinet 401. A rectifier 441 with a heat sink (not shown) is contained within the power conversion unit 440 and is located proximate an intake vent 442 that is proximate a vent 405 in the left wall of cabinet 401. The power conversion unit 440 also includes an exit vent 443 proximate the rectifier 441 whereby the rectifier may be cooled as air is drawn into the power conversion unit 440 through intake vent 442 and out through exit vent 443.

The airflow channeling structure 420 thus provides a means to channel an airflow in a series path, the path first passing through an internal fan in alternator 120 and then through the engine fan 111. The air passing through the alternator 120, which is relatively cool when drawn through the front vents 121, is slightly heated when driven through the side vents 122 into the outer chamber. The slightly-heated air is then drawn by the engine fan 111 from the outer chamber into the inner chamber; the engine fan 111 forces the slightly-heated air over the engine 110, which cools the engine which generally operates at a relatively-high temperature. The air then passes over and around the exhaust manifold and muffler, cooling the exhaust system, before exiting through the exhaust vent 430.

Although the present invention has been described in detail, those skilled in the art should understand that they can make various changes, substitutions and alterations herein without departing from the spirit and scope of the invention in its broadest form. In particular, the airflow channeling principles disclosed herein are not limited to a particular engine or alternator, but may be adapted for use with engine and alternator structures other than those illustrated and described herein; the scope of the claims recited hereinafter are intended to cover such alternative structures.

What is claimed is:

1. A backup power system, comprising:

an enclosure;

an engine, having an air inlet, located within said enclosure;

an alternator, coupled to and driven by said engine, that converts mechanical power derived from said engine into AC electrical power; and a baffle, located within said enclosure and about a portion of said engine to block direct fluid communication from within said alternator to within said engine, that guides cooling air received into said enclosure sequentially through said alternator to cool said alternator, around said baffle and said engine, through said air inlet and into said engine to cool said engine and through an outlet port of said baffle, said baffle thereby establishing a serial path within said enclosure for said cooling air.

2. The backup power system as recited in claim 1 further comprising a rectifier, coupled to an electrical output of said alternator, that converts said AC electrical power into DC electrical power, said baffle guiding said cooling air to cool said rectifier before guiding said cooling air through said alternator.

3. The backup power system as recited in claim 1 wherein said engine has a muffler located proximate said outlet port, engine exhaust expelled from said muffler mixing with cooling air expelled through said outlet port.

4. The backup power system as recited in claim 1 wherein said baffle forms a double wall with said enclosure to cause said cooling air to cool said enclosure.

5. The backup power system as recited in claim 1 wherein said cooling air is received through a single air intake in said enclosure.

6. The backup power system as recited in claim 1 wherein said baffle divides said enclosure into first and second compartments, said first compartment containing control circuitry and receiving said cooling air before said second compartment.

7. The backup power system as recited in claim 1 wherein said alternator is employed to power telecommunications equipment.

8. A method of cooling a backup power system, comprising the steps of:

receiving cooling air into an enclosure surrounding said backup power system;

next employing a baffle to guide said cooling air sequentially through an alternator within said enclosure to cool said alternator, said baffle located between said alternator and an engine coupled thereto to block direct fluid communication from within said alternator to within said engine;

next guiding said cooling air around said baffle and said engine with said baffle; and next allowing said cooling air to enter an air inlet to cool said engine, said cooling air expelled from said engine through an outlet port of said baffle, said baffle thereby establishing a serial path within said enclosure for said cooling air.

9. The method as recited in claim 8 further comprising the step of cooling a rectifier within said enclosure before performing said step of next employing.

10. The method as recited in claim 8 wherein said engine has a muffler located proximate said outlet port, said step of next allowing comprising the step of mixing engine exhaust expelled from said muffler with cooling air expelled through said outlet port.

11. The method as recited in claim 8 wherein said baffle forms a double wall with said enclosure, said step of next guiding comprising the step of cooling said enclosure with said cooling air.

12. The method as recited in claim 8 wherein said step of receiving comprises the step of receiving said cooling air through a single air intake in said enclosure.

13. The method as recited in claim 8 wherein said baffle divides said enclosure into first and second compartments, said method comprising the step of receiving said cooling air into said first compartment to cool control circuitry therein before performing said step of next employing.

14. The method as recited in claim 8 further comprising the step of employing said alternator to power telecommunications equipment.

15. A pole-mountable backup power system for providing backup DC electrical power to telecommunications equipment, said backup power system comprising:

an enclosure;

an engine, having an air inlet and a muffler for expelling exhaust therefrom, located within said enclosure;

an alternator, coupled to and driven by said engine, that converts mechanical power derived from said engine into AC electrical power;

a rectifier, coupled to an electrical output of said alternator, that converts said AC electrical power into said DC electrical power; and a baffle, located within said enclosure and about a portion of said engine to block direct fluid communication from within said alternator to within said engine, that guides cooling air received into said enclosure sequentially through said rectifier to cool said rectifier, through said alternator to cool said alternator, around said baffle and said engine, through said air inlet and into said engine to cool said engine and through an outlet port of said baffle proximate said muffler to mix said cooling air with said exhaust, said baffle thereby establishing a serial path within said enclosure for said cooling air.

16. The backup power system as recited in claim 15 wherein said baffle forms a double wall with said enclosure to cause said cooling air to cool said enclosure.

17. The backup power system as recited in claim 15 wherein said cooling air is received through a single air intake in said enclosure.

18. The backup power supply as recited in claim 15 wherein said engine has a single air inlet.

19. The backup power system as recited in claim 15 wherein said baffle divides said enclosure into first and second compartments, said first compartment containing control circuitry and receiving said cooling air before said second compartment.

20. The backup power system as recited in claim 15 further comprising a mounting bracket, coupled to said enclosure, that allows said backup power system to be mounted to a telephone pole.

* * * * *